United States Patent
Kikinis

(10) Patent No.: US 6,201,804 B1
(45) Date of Patent: Mar. 13, 2001

(54) NETWORK TELEPHONY INTERFACE SYSTEMS BETWEEN DATA NETWORK TELEPHONY AND PLAIN OLD TELEPHONE SERVICE INCLUDING CTI ENHANCEMENT

(75) Inventor: Dan Kikinis, Saratoga, CA (US)

(73) Assignee: Genesys Telecomunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 09/038,677

(22) Filed: Mar. 9, 1998

Related U.S. Application Data

(62) Division of application No. 09/024,923, filed on Feb. 17, 1998.

(51) Int. Cl.[7] .................................................. H04L 12/64
(52) U.S. Cl. ........................... 370/352; 370/356; 379/309
(58) Field of Search ................................... 370/352, 353, 370/354, 356, 401, 402, 467, 468; 379/88.17, 309, 265, 266

(56) References Cited

U.S. PATENT DOCUMENTS 5,848,143 * 12/1999 Andrews et al. .................... 370/352
5,940,479 * 12/1999 Guy et al. ............................ 370/410

FOREIGN PATENT DOCUMENTS

2315190 * 1/1998 (GB) ............................ H04L/12/66

* cited by examiner

*Primary Examiner*—Huy D. Vu
(74) *Attorney, Agent, or Firm*—Donald R. Boys; Central Coast Patent Agency

(57) ABSTRACT

A telephony call center system has Data Network Telephony (DNT)-capable telephone apparatus at agent stations connected on a Local Area Network (LAN), a data router at the call center connected on the LAN with a data port connected to a data network capable of transmitting Data Network Telephony (DNT) calls, and a Computer Telephony Integration (CTI) Server connected by a CTI link to the data router. A bridge unit is connected to the same data network at a remote (network) location by a data network port, and to a Connection Oriented/Switched Telephony (COST) network by a second port. The bridge unit further includes conversion circuitry for converting data dynamically between DNT and COST telephone calls, and control routines adapted to receive a first call from one of the COST and DNT networks, to place a call associated with the received call on the network other than the network on which the call is received, and to dynamically convert data between the associated calls. In a preferred embodiment the COST network is a Publicly-Switched Telephone Network (PSTN) and the data network is the Internet. Also in a preferred embodiment the CTI Server in the call center is connected by a separate data link to a CTI server at Service Control Point in the COST network for cooperation in call processing.

16 Claims, 5 Drawing Sheets

NETWORK TELEPHONY INTERFACE SYSTEMS BETWEEN DATA NETWORK TELEPHONY AND PLAIN OLD TELEPHONE SERVICE INCLUDING CTI ENHANCEMENT

CROSS-REFERENCE TO RELATED DOCUMENTS

The present patent application is a Divisional application of copending patent application Ser. No. 09/024,923 filed on Feb. 17, 1998.

FIELD OF THE INVENTION

The present invention is in the field of telephony communication and pertains more particularly to methods and apparatus for seamless interfacing and integration of telephony on different networks.

BACKGROUND OF THE INVENTION

In the field of telephony communication, there have been many in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification (ANI). If the call center is computer-enhanced (CTI) the phone number of the calling party may be used to access additional information from a customer information system (CIS) database at a server on the network that connects the agent workstations. In this manner information pertinent to a call may be provided to an agent, often as a screen pop.

Proprietorship of CTI equipment both at individual call-centers and within a telephone network can vary widely. For example, a phone company may provide and lease CTI equipment to a service organization hosting a number of call-centers. A telecommunications company may provide and lease CTI equipment and capability to an organization hosting call centers. In many cases, a service organization (call center host) may obtain and implement it's own CTI capability and so on.

In recent years, advances in computer technology, telephony equipment, and infrastructure have provided many opportunities for improving telephone service in publicly-switched and private telephone intelligent networks. Similarly, development of a separate information and data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer-simulated telephony is Data-Network Telephony (DTN).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional system is familiar to nearly all, and is often referred to in the art as Plain Old Telephony Service (POTS). This designation is more strictly applied in the language of the art, however, to analog-only systems, and might be confusing to many if used in the context of this specification. The computer-simulated, or DNT systems are familiar to those who use and understand computer systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach such as an Internet Service Provider (ISP). The definitive difference is that the older, more conventional telephony may be considered to be connection-oriented, switched telephony. In these systems, calls are placed and connected (switched) to occupy a specific, dedicated path, and the connection path is maintained over the time of the call. Bandwidth is thus assured. Other calls and data do not share a connected channel path in such a dedicated connection system, except in the instance of conferenced calls, wherein the conferenced calls are still dedicated to the established path. In a typical DNT system, on the other hand, the system is not dedicated connection oriented. That is, data, including audio data, is prepared, sent, and received as data packets. The data packets share network links, and may travel by varied and variable paths. There is thus no generally dedicated bandwidth, unless special systems, such as RSVP systems known in the art, are used for guaranteeing bandwidth during a call. For these reasons, the dedicated-connection, switched systems (non-DNT) are referred to in this specification as COST systems, meaning Connection Oriented/Switched Telephony.

Under ideal operating circumstances a DNT network, such as the Internet, has all of the audio quality of conventional public and private COST networks, and many advantages accruing from the aspect of direct computer-to-computer linking. DNT systems are also typically implemented with equipment less extensive and expensive than those necessary for COST systems. However, DNT calls must share the bandwidth available on the network in which they are traveling. As a result, real-time voice communication may at times suffer dropout and delay. This is at least partially due to packet loss experienced during periods of less than needed bandwidth which may prevail under certain conditions such as congestion during peak periods of use, and so on.

Recent improvements to available technologies associated with the transmission and reception of data packets during real-time DNT communication have made it possible to successfully add DNT, principally IPNT capabilities to existing CTI call centers. Such improvements, as described herein and known to the inventor, include methods for guaranteeing and verifying available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In typical call centers, DNT is accomplished by Internet connection and IPNT calls. For this reason, IPNT and the Internet will be used almost exclusively in examples to follow. It should be understood, however, that this usage is exemplary, and not limiting.

In systems known to the inventors, incoming IPNT calls are processed and routed within an IPNT-capable call-center in much the same way as COST calls are routed in a CTI-enhanced center, using similar or identical routing rules, waiting queues, and so on, aside from the fact that there are two separate networks involved. Call centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR's), agent-connecting networks, and so on, with the capability of understanding Internet protocol, data arriving from either network may be integrated requiring less equipment and lines to facilitate processing, storage, and transfer of data. However, telephony trunks and IPNT network lines representing the separate networks involved still provide for significant costs and maintenance.

In some current art implementations, incoming data from the COST network and the Internet is caused to run side by side from the network level to a call center over a telephone connection (T1/E1) acting as a telephone-data bridge, wherein a certain channels are reserved for COST connection, and this portion is dedicated as is necessary in COST protocol (connection oriented), and the remainder is used for DNT such as IPNT calls, and for perhaps other data transmission. Such a service is described in more detail below as prior art, and is generally offered by a local phone company. This service eliminates the requirement for leasing numerous telephony trunks and data-network connections. Routing and other equipment, however, must be implemented at both the call-center level and network level significantly reducing any realized cost savings.

A significant disadvantage of such a bridge, having dedicated equipment on each end, is the dedicated nature of individual channels over the bridging link. Efficient use of bandwidth cannot be assured during variable traffic conditions that may prevail at certain times. For example, dedicated channels assigned to IPNT traffic would not be utilized if there were not enough traffic to facilitate their use. Similarly, if there was more COST traffic than the allotted number of COST channels could carry, no additional channels could be made available.

In a yet more advanced system, also described in more detail below as prior art, and known in some call centers, a central switch within the call center is enhanced with IP conversion capability and can communicate via LAN to connected IP phone-sets and PC's eliminating the need for regular telephone wiring within a call center. However, the service is still delivered via a telephone-data bridge as described above. Therefore, additional requirements for equipment and inefficiency regarding use of bandwidth are still factors.

What is clearly needed is a method and apparatus whereby COST calls may be seamlessly converted to DNT, such as IPNT calls at the network level and routed to a call center as IPNT calls. Also other types of DNT calls maybe similarly converted into IPNT calls. Such a method and apparatus would eliminate the need for conventional telephone-switching equipment and routers as well as multiple types of networks and 1 wiring sets in a call center, and allow full-service call centers to be implemented and operated wholly without COST equipment, and at a significant cost reduction both for equipment and operation.

SUMMARY OF THE INVENTION

In a preferred embodiment of the present invention a Computer-Telephony Integration (CTI)-enhanced telephony system is provided, comprising a Data Network Telephony (DNT) call center at a first location, the call center having multiple agent stations with DNT-capable telephone apparatus connected on a local area network (LAN) to a Data Router in turn connected to a data network capable of carrying DNT calls; a CTI Server connected by a CTI link to the data router, the CTI server adapted to execute CTI applications; and a computerized telephony bridge at a second location remote from the first location. The computerized bridge has a trunk-line port and associated circuitry for receiving and placing Connection-Oriented/Switched Telephony (COST) telephone calls on a COST network; a data network port and associated circuitry for receiving and placing Data Network Telephony (DNT) calls on the data network; conversion circuitry for converting data dynamically between DNT and COST telephone calls; and control routines adapted to receive a first call from one of the COST and DNT networks, to place a call associated with the received call on the network other than the network on which the call is received, and to dynamically convert data between the associated calls. The computerized telephony bridge is coupled to the data router at the first location by the data network capable of carrying DNT telephony calls.

In preferred embodiments the data network is the Internet, and the DNT calls are Internet Protocol Network Telephony (IPNT) calls. The DNT-capable telephone apparatus may be a DNT-telephony-capable telephone or a multi-media personal computer (PC). In some embodiments the bridge further comprises a digitally-stored look-up table relating COST telephone numbers to IP addresses, and the control routines are adapted to retrieve specific data from an incoming call, either COST or DNT, and to use the retrieved data to access the look-up table to determine an associated COST telephone number or IP address, and to use the associated COST telephone number or IP address to place a call associated with the incoming call. The specific data from the incoming call may be coded in a portion of an IP address associated with the incoming call. In other instances the control routines are adapted to receive a DNT call from a caller, and to negotiate with the caller to ascertain a COST telephone number to use to place a COST call associated with the incoming DNT call. In still other instances the bridge further comprises an Interactive Voice Response (IVR) unit, and the IVR unit negotiates with the caller to ascertain a COST telephone number for a call to be associated with the incoming DNT call.

In further embodiments the system further comprises a COST telephone network having a Service Control Point (SCP) connected to the trunk line port of the computerized telephony bridge and a COST network CTI server connected to the SCP, wherein the CTI. Server at the call center is connected to the COST network CTI center by an auxiliary data link separate from the DNT link to the router at the call center. In this arrangement the CTI server at the call center cooperates with the network CTI server at the SCP in call processing, which may include such functions as pre-routing of incoming calls at the SCP based on data transferred from the CTI Server at the call center and eliciting information from callers at the SCP and transfer of the elicited information to the CTI Server at the call center via the separate data link.

In still further embodiments there may be additional call centers at separate locations, each having two or more agent stations, a computerized DNT router at each agent station connected to the DNT network and to the DNT interfaces at the agent stations, with each router having a separate IP address and each router adapted to receive DNT calls from the computerized telephony bridge and to route the calls to individual DNT equipment at the agent stations connected to the router at each host location based on pre-stored routing rules, which may be different at different host locations. Methods for practicing the inventions herein are disclosed in enabling detailed below as well.

BRIEF DESCRIPTION OF THE DRAWING FIGURES

DESCRIPTION OF THE PREFERRED EMBODIMENTS

Figure 1:
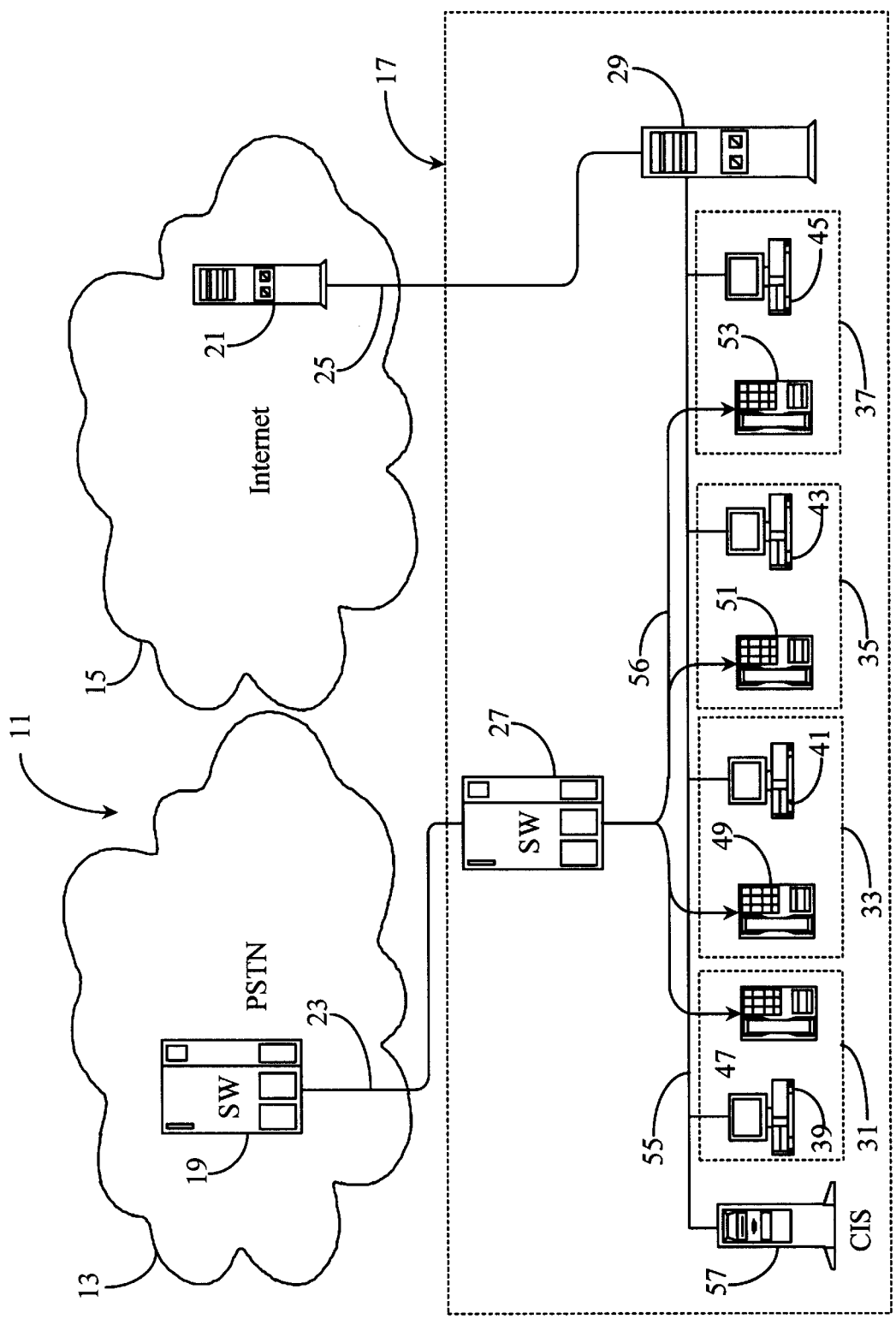
FIG. 1 is a system diagram of a prior art call center and network connections, wherein the call center is capable of both COST and DNT call handling.

FIG. 1 is a system diagram of a prior art call center and network connections, wherein the call center is capable of both COST and IPNT call handling. In FIG. 1 telecommunications network 11 comprises a publicly-switched telephone network (PSTN) 13, the Internet network 15, and a call center 17. PSTN network 13 may be a private network rather than a public network, and Internet 15 may be another public or a private data network as are known in the art.

In this basic prior art example, call center 17 is equipped to handle both COST calls and IPNT calls. Both COST calls and IPNT calls are delivered to call-center 17 by separate network connections. For example, a telephony switch 19 in the PSTN may receive incoming telephone calls and rout them over a COST network connection 23 to a central switching apparatus 27 located within call center 17. IPNT calls via Internet 15 are routed via a data router 21 over a data-network connection 25 to an IPNT router 29 within call center 17. In this example, network switch 19 is meant to represent a wide variety of processing and switching equipment in a PSTN, and router 21 is exemplary of many routers and IP switches in the Internet, as known in the art.

Call center 17 further comprises four agent stations 31, 33, 35, and 37. Each of these agent stations, such as agent station 31, for example, comprises an agent's telephone 47 for COST telephone communication and an agent's PC/VDU 39 for IPNT communication and additional data processing and viewing. Agent's telephones 49, 51, and 53 along with agent's PC/VDU 41, 43, and 45 are in similar arrangement in agent stations 33, 35, and 37 respectively. Agent's telephones, such as agent's telephone 49, are connected to COST switching apparatus 27 via telephone wiring 56.

A LAN 55 connects agent's PC/VDU's to one another and to a CPE IPNT router 29. A customer-information-service (CIS) server 57 is connected to LAN 55 and provides additional stored information about callers to each LAN-connected agent. Router 29 routes incoming IPNT calls to agent's PC/VDU's that are also LAN connected as previously described. A data network connection 25 connects data router 29 to data router 21 located in Internet 15. Specific Internet access and connectivity is not shown, as such is well known in the art, and may be accomplished in any one of several ways. The salient feature to be emphasized in this prior art example is that separate connections and equipment are necessary and implemented to be able to handle both COST and IPNT calls at the call center.

Each agent's PC/VDU, such as PC/VDU 45 has a connection via LAN 55 and data network connection 25 to Internet 15 while the assigned agent is logged on to the system, however, this is not specifically required but rather preferred, so that incoming IPNT calls may be routed efficiently. Dial-up connecting rather than a continuous connection to Internet 15 may sometimes be employed.

An agent operating at an agent station such as agent station 33 may have COST calls arriving on agent's telephone 49 while IPNT calls are arriving on agent's PC/VDU 41. In this particular example lack of a connection between router 29 and switching apparatus 27 creates a cumbersome situation, requiring agents to distribute there time as best they can between the two types of calls. Thus, agent time is not utilized to maximum efficiency with respect to the total incoming calls possible from both networks.

Figure 2:
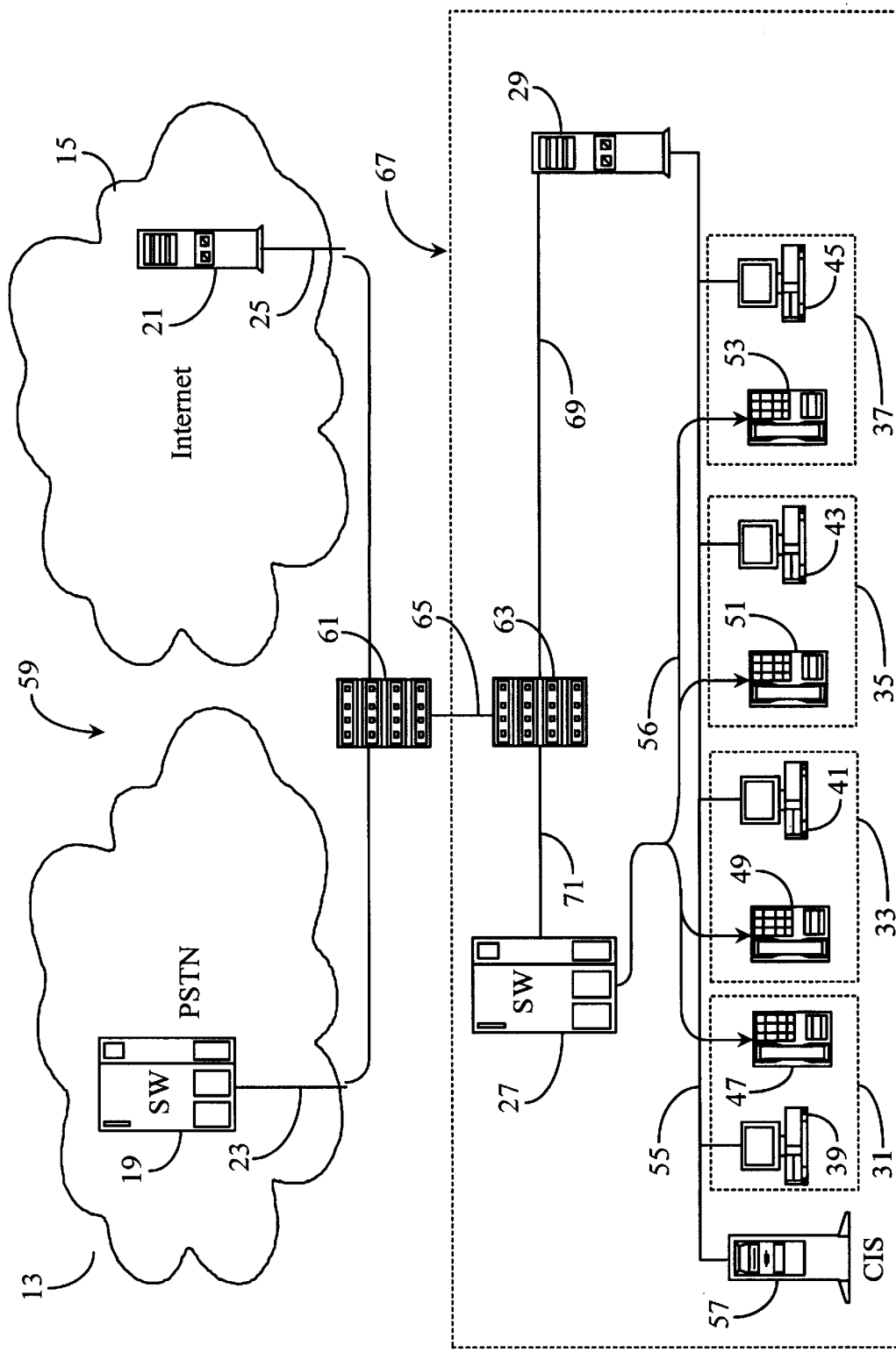
FIG. 2 is a system diagram of a prior art call center having a dedicated bridge connection for both DNT and COST calls

FIG. 2 is a system diagram of a prior art call center having a dedicated bridge connection for both IPNT and COST calls. Telecommunications network 59 comprises PSTN 13, Internet 15, and a call center 67. This prior art example is similar in architecture to the prior art example of FIG. 1 with an exception in how IPNT and COST calls are delivered to call center 67. Therefore, many of the same elements present in FIG. 1 are shown again in this example, such as telephony switching apparatus 27, agent stations 31–37, LAN connectivity, and so on.

Referring again to FIG. 2, a known network data bridging technique and apparatus is provided, most typically by a local phone company, wherein COST calls and IPNT calls may be routed side by side over one trunk to call center 67. This bridge comprises a first telephone-data modem 61, a suitable trunk connection such as a T1 or E1 trunk 65 as is known in the art, and a second telephone-data modem 63. Telephone-data modem 61 resides at the public-network level, typically with a local telephone company's equipment, but could also be in the PSTN cloud or even the Internet cloud. Telephone-data modem 61 is connected to the PSTN by exemplary COST telephony switch 19 via COST connection 23 and to exemplary data router 21 in Internet 15 via data network connection 25. Calls for call center 67 originating from the PSTN and from Internet 15 are transmitted to telephone-data modem 61. Arriving calls are then routed over dedicated channels within trunk 65 to telephony-data modem 63 at call center 67. For example, a certain number of channels within trunk 65 are dedicated to carrying COST calls while the remaining channels are dedicated to carrying IPNT calls and other data. This is not a dynamic, but a fixed allocation, wherein the portion dedicated to COST transmission remains constant.

Calls that are received at telephone-data modem 63 from trunk 65 are routed appropriately depending on type of call. For example, COST calls are routed to switching apparatus 27, and IPNT calls are routed to data router 29. In both cases, further routing to agents is the same as described with reference to the prior art example of FIG. 1.

Although the network-data bridging technique, as described above with reference to FIG. 2, requires only one connection (65) to provide both COST and IPNT service to call center 67, trunk 65 is partitioned and requires expensive hardware on both ends to provide and maintain service. Further, agents face the same issues regarding handling separate types of calls as was previously described with reference to the prior art example of FIG. 1. The dedicated bandwidth issue is still a problem because the allocation of bandwidth in trunk 65 is fixed, while call loading by type will vary.

Figure 3:
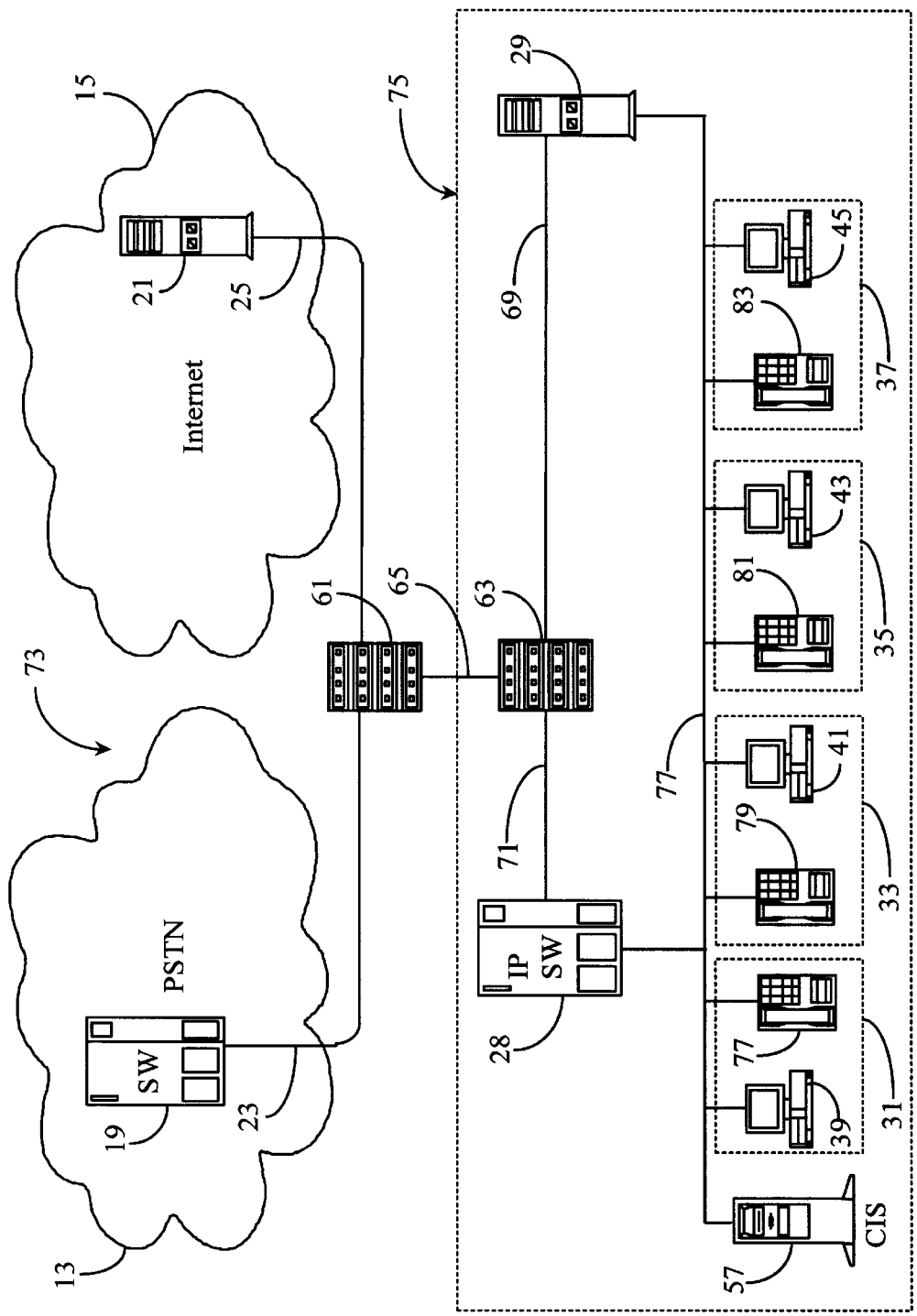
FIG. 3 is a system diagram of another call center with a dedicated bridge connection as in FIG. 2, comprising an IP telephony switch in the call center.

FIG. 3 is a system diagram of another system an art known to the inventors with a dedicated bridge connection as in FIG. 2, comprising an IP telephony switch in the call center. Telecommunications network 73 comprises PSTN 13, Internet 15, and call center 75. The architecture of telecommunications network 75 is similar to the architecture of the prior art example of FIG. 2 with at least two important differences. Firstly, call center 75 is enhanced with an Internet protocol (IP) central-telephony switch 28 that has the ability to convert PSTN call data to IP format, and to distribute the calls as IPNT calls on LAN 7. This enables incoming PSTN calls to essentially be converted into IPNT calls so far as receiving agents are concerned. Secondly, instead of regular ACD type telephones such as agent's telephone 49 of FIG. 2, each agent station 31, 33, 35, and 37 is equipped with an IP-telephone, such as telephones 77, 79, 81, and 83 respectively. Each IP-telephone such as IP-telephone 81, for example, is connected to LAN 77. LAN 77 is enabled for IP data as well as other data that may be transmitted from time to time.

In this prior art example, the requirement for COST telephone wiring such as wiring 56 of FIGS. 1 and 2 is eliminated. Incoming COST calls arriving at telephone-data modem 63 are sent over connection 71 to IP-telephony switch 28. IP-telephony switch 28 converts COST calls to IPNT format before routing the calls to individual IP-telephones over LAN 77. IPNT calls arriving from Internet 15 at telephone-data modem 63 are routed over connection 69 to data router 29 and on to agent's PC/VDU's or agent's IP telephones in the same procedure as described with reference to the prior art example of FIG. 2.

An advantage of this embodiment is that agents may handle both COST-IPNT calls (COST calls converted to IPNT format in IP-telephony switch 28) and regular IPNT calls with either a LAN connected IP-telephone or a LAN connected PC/VDU. Agent time is better utilized. However, the hardware used to facilitate the network-data bridging technique as described with reference to the prior art example of FIG. 2 is not eliminated. Therefore, cost savings is still relatively limited.

Figure 4:
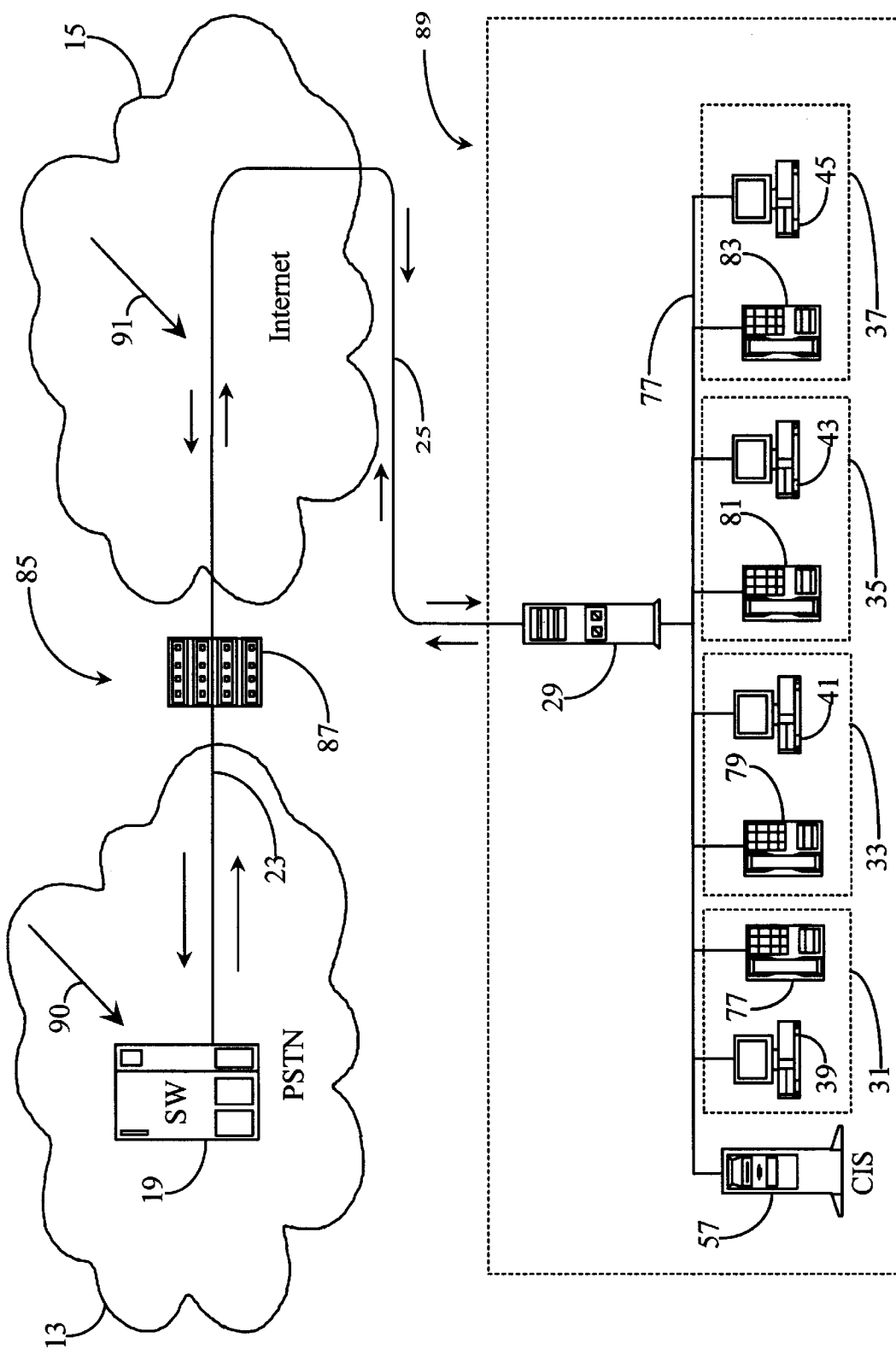
FIG. 4 is a system diagram of a DNT call center and connections to network level, including a unique bridge unit, in an embodiment of the present invention.

FIG. 4 is a system diagram of an IPNT call center and connections to network level, including a unique bridge unit, in an embodiment of the present invention. It is emphasized that the system shown and the description below of the system is exemplary only, and not limiting in the breadth of the present invention. The IPNT aspects of the call center could be implemented in a different, but still data network type protocol. Also the fact of a call center in the example is exemplary. The call center may be any DNT local or customer-premises type system, such as a telephone system at any company.

In this embodiment of the invention COST calls, represented in PSTN network 13 by arrow 90, are converted to IPNT format at the network level before being routed to a call center, and IPNT calls may also be converted to COST calls. This unique and innovative capability would, in a preferred embodiment, be provided by a local telephone company as a service to companies hosting IPNT call centers. The conversion, however, is not limited to the equipment of a local phone company. The conversion bridge may also be in the PSTN or other network, or in the Internet space. Conversion also is not limited to two networks, although examples to follow show two networks for simplicity in description. Bridge units according to the invention may connect to, and operate between three, four, or more networks.

Telecommunications network 85 comprises PSTN 13, Internet 15, and an IPNT-enhanced call-center 89. According to a preferred embodiment of the present invention, a COST-IPNT computerized bridge 87 is provided as a universal bi-directional connection between PSTN 13 and Internet 15. For example, bridge 87 has the ability to convert COST calls to IPNT and IPNT calls to COST format, and also to receive and place calls of both types.

In an example, COST calls received on trunk 23 may be associated with an IP address and routed through Internet 15 to a call center 89, or to any other IP address. In a preferred embodiment IP addresses are associated in a database either resident in the computerized bridge unit or accessible to the bridge. Companies having IP-only call centers may now advertise an 800 (or other no-charge-to-calling-party) COST number, that can be matched via the database to an IP address of a first data-router such as data router 29 within call center 89. Such a database may be relatively limited, such as to clientele of a local telephone company providing the service, or, in the opposite extreme, every COST number assigned in the world may be associated in such a database with an IP address.

Now, a call center such as call center 89 may be implemented as an IPNT-only call center, eliminating much hardware, software, and connectivity associated with prior art call centers. For example, because all incoming calls to call center 89 are now IPNT calls, expensive COST telephony switching apparatus normally found within call centers are no longer required. IP switching apparatus as shown in FIG. 3 is no longer required. COST telephony wiring such as wiring 56 of FIG. 2 is similarly eliminated. A range of other equipment and software associated with COST call centers is also eliminated. Call center functions are substituted with less expensive and easier managed IPNT counterparts running appropriate software applications. Expensive network cabling and hardware used in prior art bridging techniques as described with reference to FIGS. 2 and 3 above is eliminated as well. As a result, companies offering the service as well as companies hosting call centers realize substantial cost reductions related to previously required architecture and infrastructure.

Referring again to FIG. 4, PSTN callers may dial an 800 number, as previously mentioned, that connects them to bridge 87. A matching IP address is retrieved, typically from a database, and the COST call is then converted to IPNT format and routed via the best route available through Internet 15. All quality assurance techniques such as reserving bandwidth, compression techniques, special servers, firewall applications, encryption, and so on, as known to the inventor may be applied.

All incoming calls to call center 89 are now IPNT calls and are received and routed via data router 29 to agents working at agent stations 31, 33, 35, and 37. IPNT calls originating from a caller at a COST number are handled in the same way as IPNT calls originating from Internet 15. Thus, a seamless integration is achieved.

This innovative system and apparatus also works in reverse as follows: An IPNT call may be initiated by an agent within call center 89, perhaps as a call back to a COST caller, and connection may be achieved in a variety of ways. In one embodiment, bridge 87 has voice response or software code capability whereby an agent may offer a COST caller's phone number via spoken voice, software code, key stroke (if using PC/VDU), or touch tone (if using IP telephone) enabling a lookup and subsequent dialing of a COST caller's number. When the called party answers, conversation may ensue between the agent at call center 89 and the called party on a COST telephone connected anywhere to the PSTN network. Also, calls coming from the Internet cloud, represented by arrow 91, may be redirected over the bridge to a COST call center.

In an alternative embodiment, a COST telephone number may be encoded by an agent in call center 89 into an IP address of the bridge, and the bridge is adapted to extract that COST number from the IP address or other header in an incoming IP call from the call center. The coded portion of the IP address may also have just a key instead of the entire COST number, and the key may allow look-up in a stored table at the bridge to certain the COST number to which the call may be connected and translated.

In yet another alternative embodiment, customers may be given IP addresses if they do not already have one so that a general table listing PSTN numbers to IP address numbers may be created and kept both at call center 89 and at COST-IPNT bridge 87. In this instance, customers who do not own a computer would still have a registered IP address for matching purposes. An agent could supply the IP address via voice or other methods as previously described. A database of COST numbers and IP address matches could be far reaching and could conceivably include anyone weather they have patronized a call center or not, or weather they own a computer or not.

In some embodiments of the present invention, data router 29 would not be required. This would be a case wherein the method and apparatus of the present invention is used with a very small call-in location, perhaps operating only a few agent stations or, perhaps, only one agent station. COST-IPNT bridge 87 would route calls directly to the IP address of the agent's computer or IP. Further, routing may be accomplished via an agent's PC/VDU if there is more than one, but a relatively few operating agents.

In still another embodiment, back-up IP addresses may be programmed into COST-IPNT bridge 87 so that when a COST caller dials a free-to-calling-party number, after conversion to IPNT format a first IP address may be replaced by a second or back-up IP address if there is a long wait or if the first IP address is busy. In this case the converted call would be routed to the second choice IP address, and so on. This could be particularly useful for small business wherein only a few contacts are available and expense for a data router would be prohibitive.

Figure 5:
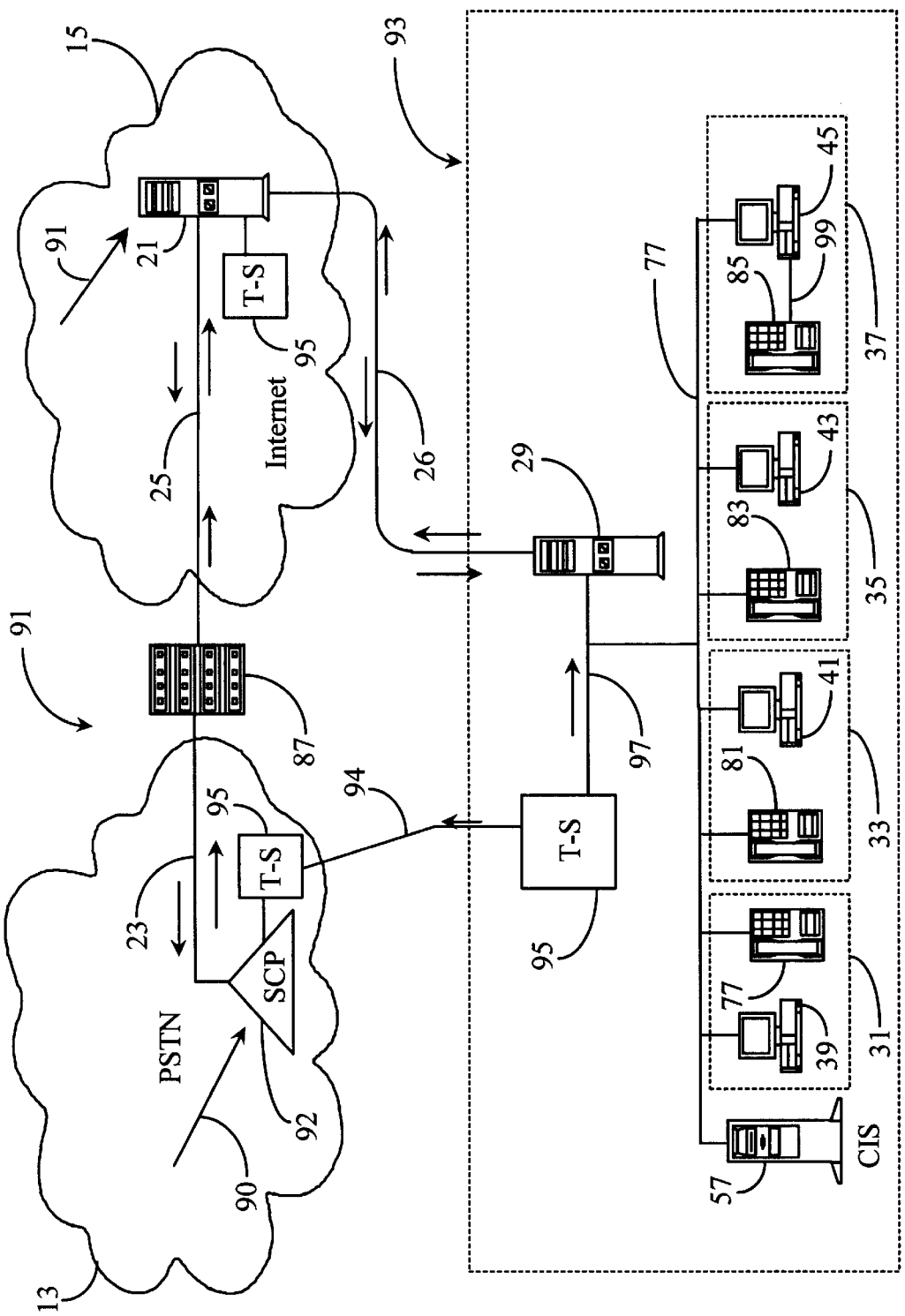
FIG. 5 is a system diagram of the unique call center system and connections of FIG. 4, further showing CTI enhancement.

FIG. 5 is a system diagram of the unique call center system and connections of FIG. 4, further showing CTI enhancement. In this embodiment sophisticated routing rules known to the inventor may be initiated and executed via transaction-server control over certain hardware (i.e. switches and routers) established in both PSTN 13 and Internet 15. This particular embodiment would most likely be utilized by large organizations hosting many call-centers which may be spread over a large geographical region.

Referring again to FIG. 5, telecommunications center 91 comprises PSTN 13, Internet 15, COST-IPNT bridge 87 and an IPNT call-center 93. A service control point (SCP) 92 processes incoming COST calls represented by vector 90. A CTI processor 95 executing one or more CTI applications, and known as a T-Server (TS) is connected to router 29. T-Server 95 is connected in the call center to router 29, and monitors activity at router 29 and also exercises control at various levels over operation of router 29. That is, T-Server 95 may be informed of all incoming calls, exercise sophisticated routing rules, and control router 29 in following the routing rules. T-Server 95 is not limited to routing rules and algorithms, but may provide a considerable range of CTI functions. Router 27 can act as SCP for IPNT-originated calls, and may route them to the IPNT call center, or via the bridge to the COST network.

In this embodiment a second T-Server 95 is integrated with equipment at the network level, such as with the SCP in PSTN 13. The T-Server at call center 93 and the T-Server at the network level are connected by a digital link 94. Thus certain T-S routing and control routines (known to the inventor) can be executed at SCP 92. CTI hardware such as additional processors, stat-servers, intelligent peripherals, and the like that may be present in PSTN 13 are not shown but may be assumed to be present in this particular embodiment.

When a COST call arrives at SCP 92, information is typically obtained from the caller via IVR or other methods known in the art. This information may include call destination, purpose of the call, caller identity, etc. This information in some embodiments may be transmitted to call center 93 via link 94 before delivery of the actual call. Based on the information obtained at SCP 92 and, perhaps additional data supplied by T-S 95, the call is routed to a predetermined destination, in this case, COST-IPNT bridge 87 over telephone network connection 23. In another embodiment, T-S 95 may cause an incoming COST call to be routed to another COST-IPNT bridge, or some other destination.

As described with reference to FIG. 4, COST calls arriving at bridge 87 are routed through Internet 15 on data-network connection 25 as IPNT calls. The bridge serves as a dynamically translating interface. A data router 21 is shown connected to line 25 within Internet 15 and is used as a first destination of COST-IPNT bridge 87.

In some embodiments T-S 95 at the call center may also interact with router 21, exemplary of routers and IP switches in the Internet, via connection 26. There may also be instances of T-Servers 95 as shown associated with Internet routers and switches, which may communicate with T-Server 95 at call center 93, to provide CTI functions in the network initiated at call center level.

If it is determined by a T-Server 95 that a call has been miss-routed due to error, for example, it can reroute the call to another location in Internet 15, such as another routing point, or it can rout the call back to PSTN 13 through PSTN/IPNT bridge 87 where the call would be converted back to a PSTN call and sent back to SCP 92, or perhaps another location within PSTN 13. In this and other ways T-S 95 may exercise control over calls at the network level before a call arrives at call-center 93.

In the absence of rerouting, calls arriving at data router 29 are further routed to individual agents as they become available to handle calls. Either IP telephones such as IP telephone 83 or PC/VDU's such as agent's PC/VDU 45 may be used to answer calls. Also, conventional telephones may also be connected individually to PC/VDU's as is shown with reference to agent station 37. In this case, IP telephone 85 is not connected to LAN 77 but rather to PC/VDU 45 via a cable 99. Cable 99 would, in embodiments known to the inventor, act as an interfacing cable connecting the telephones speaker and microphone functions to a sound card on PC/VDU 45 allowing an IPNT transaction to handled by a conventional telephone. There are several ways such an interface may be made.

The embodiment described with reference to FIG. 5 is useful where sophisticated routing rules are to be implemented. Load balancing between call centers, statistical routing, predictive routing, take-back-and transfer, and other functionality known to the inventor can be applied through T-Server control.

It will be apparent to one with skill in the art that the method and apparatus of the present invention may be used in very large call-center embodiments or in very small call-in centers without departing from the spirit and scope of the present invention. COST-IPNT bridge 87 can be set up to facilitate many companies of various sizes. For example, in one embodiment, a two man company or even an isolated salesman operating from a computer-enhanced sales-order desk may subscribe to a service providing advantages according to the present invention and have their IP address or addresses programmed directly into COST-IPNT bridge 87 so as obviate use of expensive telephone call center equipment.

In another embodiment, a large call center host organization may utilize the present invention with T-server control to distribute calls over a wide geographic region with many call centers and routing points. It will also be apparent to one with skill in the art that there may be many more than one COST-IPNT bridge such as bridge 87 distributed over different geographic locations, and that a single company may reserve access to more than one COST-IPNT bridge at those different locations.

Further, it will be apparent to the skilled artisan that the method and apparatus of the present invention may be applied to many varying network and call center architectures and infrastructures without departing from the spirit and scope of the present invention. For example, instead of applying the method and apparatus of the present invention to PSTN 13 and Internet 15, a private telephone network and a separate and private wide area data network may utilized, and so on. Also, call centers subscribing to services according to embodiments of the present invention may be pure IPNT call centers, or a combination of COST and IPNT. Such a case would be a large call center offering many different areas of service via IPNT whereas bill collection or credit analysis is still handled via COST telephony, and so on. The spirit and scope of the present invention is limited only by the claims that follow.

In yet another aspect of the invention, bridges similar to bridge 87 may be provided between any two protocol-incompatible networks. The interface and functionality described is not necessarily limited to connection-oriented networks interfacing with non-connection-oriented networks. Two DNT networks of dissimilar data protocol could be similarly linked, and two connection-oriented networks having incompatible call protocol could also be similarly linked, for example.

What is claimed is:

1. A Computer-Telephony Integration (CTI) enhanced telephony system, comprising:

a Data Network Telephony (DNT) call center at a first location, the call center having multiple agent stations with DNT-capable telephone apparatus connected on a local area network (LAN) to a first Data Router in turn connected to a data network capable of carrying DNT calls;

a first CTI Server at the call center connected by a CTI link to the first data router, the CTI server adapted to execute CTI applications;

a second CTI server at the data network connected by a CTI link to a second data router and having a separate data connection to the first CTI server;

a third CTI server at a Connection-Oriented/Switched Telephony (COST) network connected by a CTI link to a SCP and having a separate data connection to the first CTI server: and a computerized telephony bridge at a second location remote from the first location; the computerized bridge comprising:

a trunk-line port and associated circuitry connected to the SCP for receiving and placing Connection-Oriented/Switched Telephony (COST) telephone calls on a COST network;

a data network port and associated circuitry connected to the second data router for receiving and placing Data Network Telephony (DNT) calls on the data network;

conversion circuitry for converting data dynamically between DNT and COST telephone calls; and control routines receiving a first call from one of the COST and DNT networks, to place a call associated with the received call on the network other than the network on which the call is received, and to dynamically convert data between the associated calls;

wherein the computerized telephony bridge is coupled to the first data router at the first location by the data network capable of carrying DNT telephony calls, and the second CTI server functions as an SCP for DNT-originated calls in the data network, and may route them to the DNT call center, or via the bridge to the COST network, and the first CTI server at the call center cooperates with the second and third network CTI servers at the SCP and second data router in call processing.

2. The system of claim 1 wherein the data network is the Internet, and the DNT calls are Internet Protocol Network Telephony (IPNT) calls.

3. The system of claim 1 wherein the DNT-capable telephone apparatus is a DNT-telephony-capable telephone.

4. The system of claim 1 wherein the DNT-capable telephone apparatus is a multi-media personal computer (PC).

5. The system of claim 1 wherein the bridge further comprises a digitally-stored look-up table relating COST telephone numbers to IP addresses, and wherein the control routines are adapted to retrieve specific data from an incoming call, either COST or DNT, and to use the retrieved data to access the look-up table to determine an associated COST telephone number or IP address, and to use the associated COST telephone number or IP address to place a call associated with the incoming call.

6. The system of claim 5 wherein the specific data from the incoming call is coded in a portion of an IP address associated with the incoming call.

7. The system of claim 1 wherein the control routines are adapted to receive a DNT call from a caller, and to negotiate with the caller to ascertain a COST telephone number to use to place a COST call associated with the incoming DNT call.

8. The system of claim 7 wherein the bridge further comprises an Interactive Voice Response (IVR) unit, and wherein the IVR unit negotiates with the caller to ascertain a COST telephone number for a call to be associated with the incoming DNT call.

9. The system of claim 1 wherein the cooperative call processing includes pre-routing of incoming calls at the SCP based on data transferred from the CTI Server at the call center.

10. The system of claim 1 wherein the cooperative call processing includes eliciting information from callers at the SCP and transfer of the elicited information to the CTI Server at the call center via the separate data link.

11. The call center system of claim 1 further comprising additional call centers at separate locations, each having two or more agent stations, a computerized DNT router at each agent station connected to the DNT network and to the DNT interfaces at the agent stations, wherein each router has a separate IP address and each router is adapted to receive DNT calls from the computerized telephony bridge and to route the calls to individual DNT equipment at the agent stations connected to the router at each host location based on pre-stored routing rules, which may be different at different host locations.

12. A method for implementing a data network telephony (DNT)-only call center, comprising steps of:

(a) forming a call center of two or more agent stations at a first host location, each agent station having a Data Network Telephony (DNT) interface connected by a local area network (LAN) to a first data router at the call center with a DNT port connected to a second data router in a data network capable of transmitting DNT telephony calls, the first data router having an IP address;

(b) connecting a data network telephony (DNT) network to the DNT port at the first data router;

(c) connecting a first Computer-Telephony Integration (CTI) Server to the first data router at the call center;

(d) connecting a second CTI server by a CTI link to the second data router;

(e) connecting, remote from the first host location, a computerized bridge unit to the DNT network by a data network port and associated circuitry for receiving and placing Data Network Telephony (DNT) calls on the data network, the bridge unit having a trunk-line port and associated circuitry for receiving and placing Connection Oriented/Switched Telephony (COST) telephone calls on a COST network having a SCP connected by a CTI link to a third CTI-server, conversion circuitry for converting data dynamically between DNT and COST telephone calls, and control routines receiving a first call from one of the COST and DNT networks, placing a call associated with the received call on the network other than the network on which the call is received, and dynamically converting data between the associated calls;

(f) receiving a COST call at the bridge unit placed by a caller on the COST network using a COST number;

(g) associating the COST call with the IP address of the first data router at the call center;

(h) placing a DNT call to the IP address;

(i) routing the DNT call to one of the agent stations based on routing rules controlled by the coordination of the CTI Servers;

(j) dynamically converting data at the bridge between the COST call and the associated DNT call, thereby effectively connecting the COST caller with an agent at the agent station.

13. The method of claim 12 wherein the data network is the Internet and the COST network is a publicly-switched telephone network (PSTN).

14. The method of claim 12 wherein, in step (a) the DNT interface is a DNT-telephony capable telephone.

15. The method of claim 12 wherein in step (a) the DNT interface is a multi-media personal computer (PC).

16. The method of claim 12 wherein the bridge unit in step (c) further comprises a digitally-stored look-up table relating COST telephone numbers to IP addresses, and wherein in step (e) the association is done by accessing the look-up table.

* * * * *